(12) United States Patent
Lee et al.

(10) Patent No.: US 8,897,225 B2
(45) Date of Patent: Nov. 25, 2014

(54) APPARATUS AND METHOD FOR CONTROLLING COMMUNICATION PATH BETWEEN MULTIPLE DIGITAL UNITS AND MULTIPLE RADIO FREQUENCY UNITS IN WIRELESS COMMUNICATION SYSTEM

(75) Inventors: Hoon Lee, Daejeon-si (KR); Seungjae Bahng, Daejeon-si (KR); Jun Woo Kim, Daejeon-si (KR); Youn Ok Park, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 302 days.

(21) Appl. No.: 13/565,832

(22) Filed: Aug. 3, 2012

(65) Prior Publication Data
US 2013/0044684 A1 Feb. 21, 2013

(30) Foreign Application Priority Data

Aug. 18, 2011 (KR) .................. 10-2011-0082439
Jun. 21, 2012 (KR) .................. 10-2012-0066486

(51) Int. Cl.
| | |
|---|---|
| H04B 1/66 | (2006.01) |
| H04W 80/04 | (2009.01) |
| H04W 40/06 | (2009.01) |
| H04W 88/08 | (2009.01) |
| H04W 28/04 | (2009.01) |

(52) U.S. Cl.
CPC .............. *H04W 40/06* (2013.01); *H04W 80/04* (2013.01); *H04W 88/08* (2013.01); *H04W 28/04* (2013.01)
USPC ........... 370/328; 370/235; 370/329; 375/241; 455/7; 455/561

(58) Field of Classification Search
CPC ...... H04L 47/10; H04W 80/04; H04W 28/04; H04W 88/08; H04B 7/2606; H04B 1/66
USPC ......... 370/235, 328, 329; 375/241; 455/7, 561
See application file for complete search history.

(56) References Cited

U.S. PATENT DOCUMENTS

| | | | |
|---|---|---|---|
| 6,618,599 B1* | 9/2003 | Son et al. ................ | 455/561 |
| 2009/0180407 A1* | 7/2009 | Sabat et al. .............. | 370/280 |
| 2010/0040372 A1 | 2/2010 | Gejbrowitz et al. | |
| 2011/0130163 A1 | 6/2011 | Saban et al. | |
| 2011/0135013 A1* | 6/2011 | Wegener ................. | 375/241 |
| 2011/0182255 A1* | 7/2011 | Kim et al. ............... | 370/329 |
| 2011/0201268 A1* | 8/2011 | He et al. ................. | 455/7 |
| 2012/0039172 A1* | 2/2012 | Kim et al. ............... | 370/235 |

FOREIGN PATENT DOCUMENTS

KR 10-2011-0087949 A 8/2011

\* cited by examiner

*Primary Examiner* — Andrew Lai
*Assistant Examiner* — Chuong M Nguyen
(74) *Attorney, Agent, or Firm* — Rabin & Berdo, P.C.

(57) ABSTRACT

The present invention relates to a communication path control apparatus for controlling a communication path between a plurality of DUs and a plurality of RFUs, and a plurality of antennas included in the plurality of RFUs and a wireless communication system including the communication path control apparatus. Each of the plurality of DUs, the plurality of RFUs, and the plurality of antennas has a unique identifier, and the path control apparatus controls paths between the plurality of DUs and the plurality of RFUs based on identifiers. Accordingly, the wireless communication system can transmit and receive a signal through a specific RFU and a specific antenna included in a specific RFU and performs the next-generation wireless BS operation method, such as CoMP and multi-BS MIMO.

20 Claims, 8 Drawing Sheets

APPARATUS AND METHOD FOR CONTROLLING COMMUNICATION PATH BETWEEN MULTIPLE DIGITAL UNITS AND MULTIPLE RADIO FREQUENCY UNITS IN WIRELESS COMMUNICATION SYSTEM

Priority to Korean patent application numbers 10-2011-0082439 filed on Aug. 18, 2011, and 10-2012-0066486 filed on Jun. 21, 2012, the entire disclosure of which are incorporated by reference herein, is claimed.

BACKGROUND OF THE INVENTION

1. Field of the Invention

The present invention relates to communication in a wireless communication system and, more particularly, to an apparatus and method for controlling a communication path between a plurality of Digital Units (DUs) and a plurality of Radio Frequency Units (RFUs) in a wireless communication system.

2. Discussion of the Related Art

In a wireless communication system, in order to reduce installation costs for a base station and secure easy management, lots of Remote Radio Head (RRH) attempts have been made to couple DUs and RFUs using a wired line, such as an optical cable, and placing only RFUs in remote places. The RFU may also be called a Radio Unit (RU). Researches are recently being carried out on an effective wired connection between DUs and RFUs while active research is carried out on Cloud Communication Center (CCC) technology for integrating the DUs of a plurality of base stations into the communication station buildings of a network service provider.

FIG. 1 is a diagram showing a connection using a Passive Optical Network (PON) network between DUs and RFUs.

In technology shown in FIG. 1, attempts are made to solve the problem using the PON network having a master and slave architecture. In this technology, an Optical Line Terminal (OLT) 110 transmits the transmission signals of the DUs 100 of a plurality of base stations to an Optical Network Units (ONU) 160 or an Optical Network Terminal (ONT) in a frequency overlay form over the PON network by using an optical combiner 120. The ONU 160 or the ONT separates the signals, received from the DUs 100, by using an optical diplexer 140 and a Frame Multiplex Control Assembly (FMCA) 150, converts the separated signals into RF signals, and transmits the converted signal to a terminal through an antenna.

FIG. 2 is a diagram showing a connection using an Ethernet line between a DU and an RF module.

Technology shown in FIG. 2 relates to a method of transmitting signals from a DU 212 in a frequency overlay form through an Ethernet line 205 by using a control unit 220, separating the signals of the DU 212 by using an Ethernet AP w/MUX 230, converting the signals into RF signals by using an RF module 240, and transmitting the converted signals to terminals 252 and 254 through antennas 238 and 244.

The above technologies suggest only the methods of coupling one DU and an RFU limited to the DU in pairs, but does not propose a method of freely coupling a specific DU and specific RFUs or coupling a specific DU and specific antennas mounted on specific RFUs.

SUMMARY OF THE INVENTION

An object of the present invention is to provide a method of controlling a communication path between a plurality of DUs, a plurality of RFUs, and a plurality of antennas in a wireless communication system.

Another object of the present invention is to provide an apparatus for controlling a communication path between a plurality of DUs, a plurality of RFUs, and a plurality of antennas in a wireless communication system.

Yet another object of the present invention is to provide a wireless communication system in which signals can be flexibly transmitted and received between a plurality of DUs, a plurality of RFUs, and a plurality of antennas.

According to an exemplary embodiment of the present invention, there is provided a path control method of a path control apparatus in a wireless communication system comprising a plurality of Digital Units (DUs), a plurality of Radio Frequency Units (RFUs), and a plurality of antennas, the path control method comprising: receiving a first signal, comprising a first identifier indicative of at least one destination RFU, from a first DU; selecting a first path to the at least one destination RFU indicated by the first identifier; and sending the first signal through the selected first path.

According to another exemplary embodiment of the present invention, there is provided a path control apparatus configured to couple a plurality of Digital Units (DUs) and a plurality of Radio Frequency Units (RFUs) in a communication system comprising the plurality of DUs, the plurality of RFUs, and a plurality of antennas, the path control apparatus, comprising: a first transceiver unit configured to receive a first signal, comprising a first identifier indicative of a destination RFU, from a first DU; a path selection unit configured to select a first path to the destination RFU based on the first identifier; and a second transceiver unit configured to send the first signal through the selected first path.

According to yet another exemplary embodiment of the present invention, there is provide a wireless communication system, comprising: a plurality of Digital Units (DUs) configured to process digital signals; a plurality of Radio Frequency Units (RFUs) configured to process radio signals; a plurality of antennas at least one of which is included in each of the plurality of RFUs; and a path control apparatus connected between the plurality of DUs and the plurality of RFUs and configured to control a path of signals between the plurality of DUs and the plurality of RFUs, wherein each of the plurality of DUs, the plurality of RFUs, and the plurality of antennas has a unique identifier, and the path control apparatus controls the path based on the identifiers.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
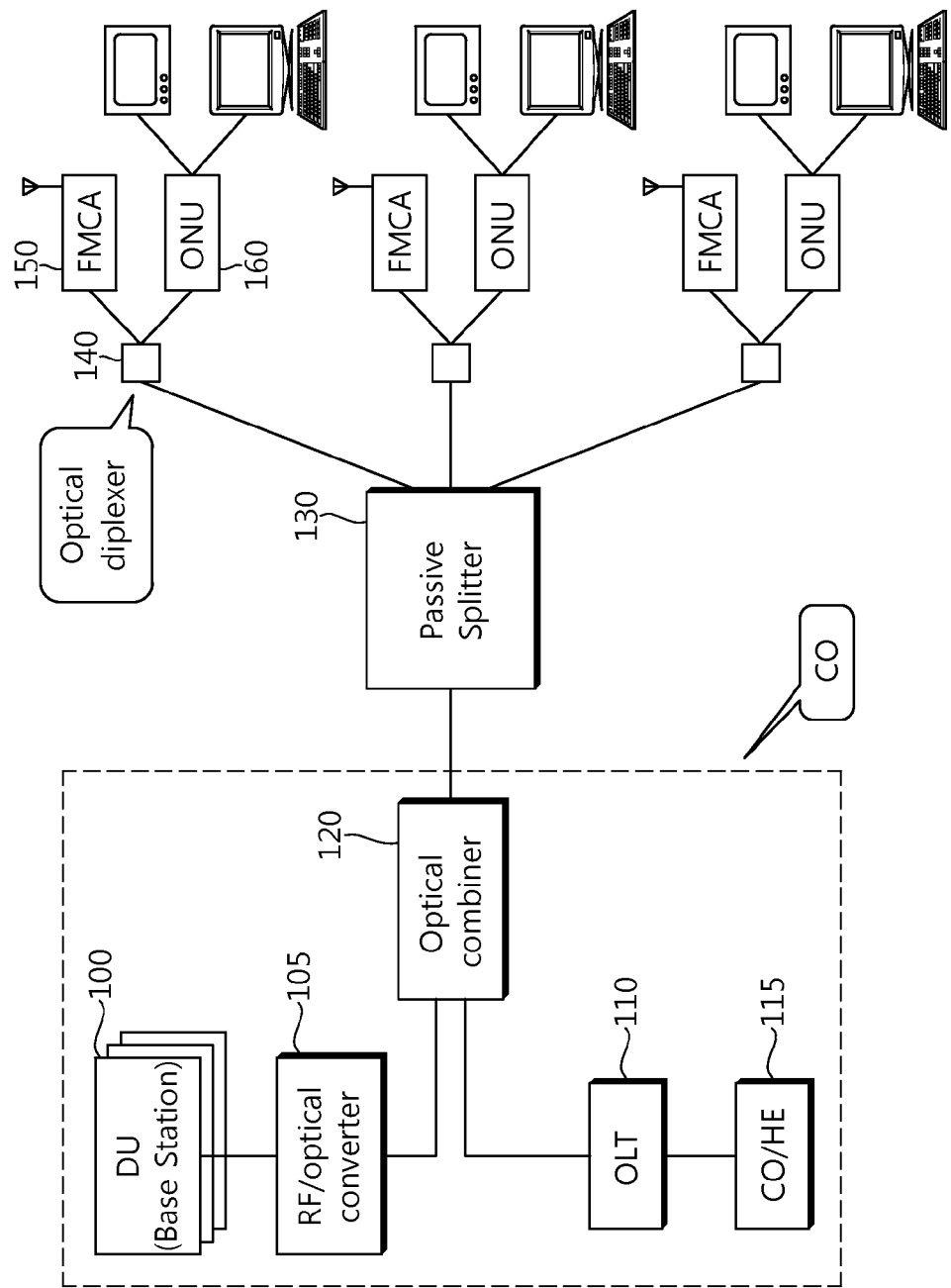
FIG. 1 is a diagram showing a connection using a Passive Optical Network (PON) network between DUs and RFUs.
Figure 2:
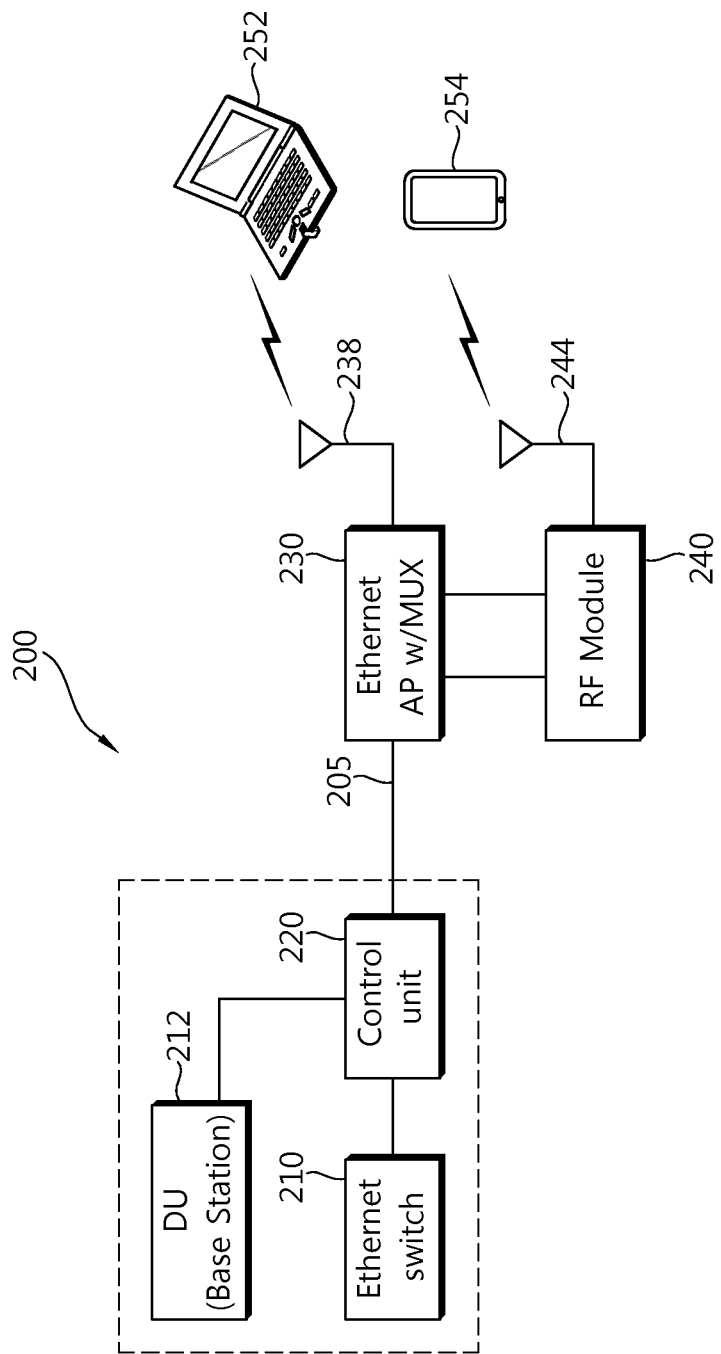
FIG. 2 is a diagram showing a connection using an Ethernet line between a DU and an RF module.
Figure 3:
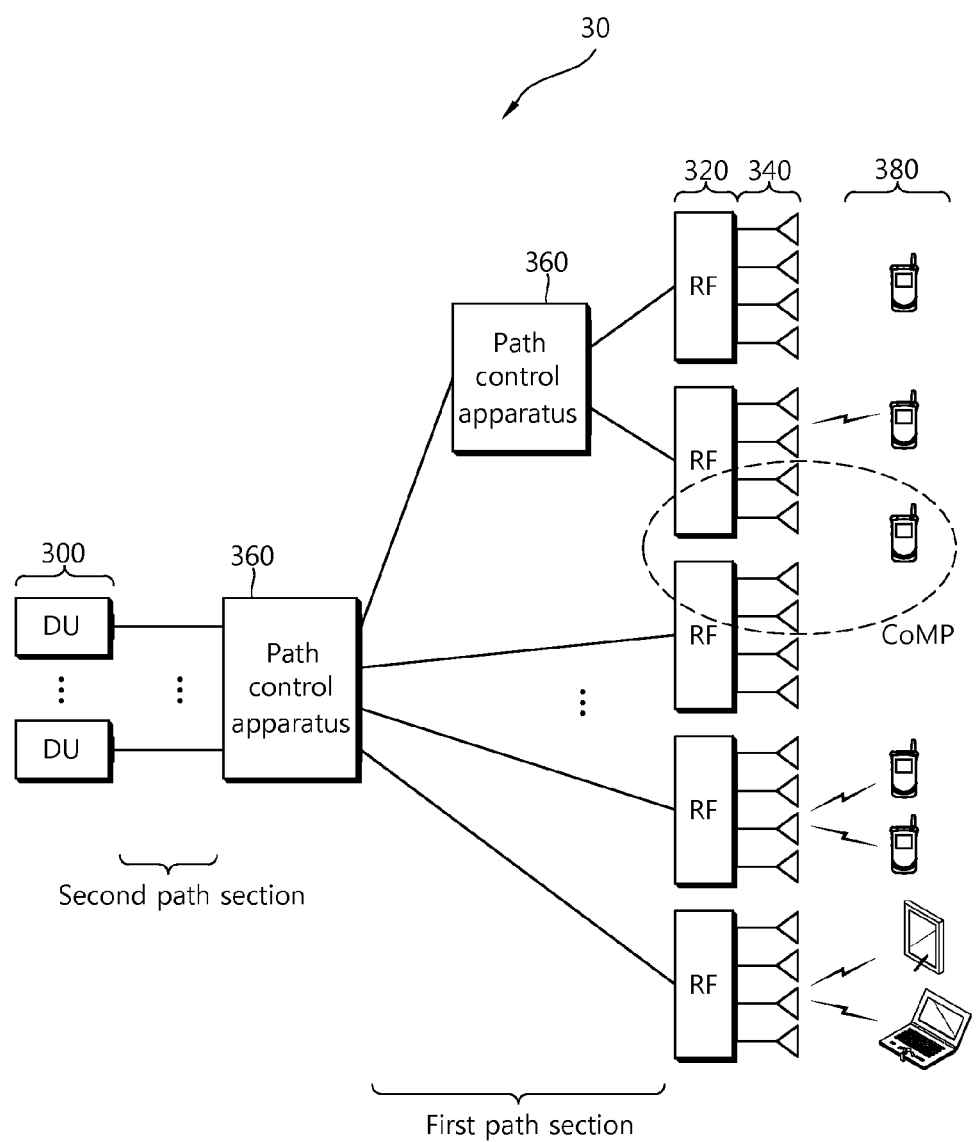
FIG. 3 shows a wireless communication system in accordance with an embodiment of the present invention.

FIG. 3 shows a wireless communication system in accordance with an embodiment of the present invention.

Referring to FIG. 3, the wireless communication system 30 includes a plurality of DUs 300, a plurality of RFUs 320, a plurality of antennas 340, a path control apparatus 360, and terminals 380. The plurality of DUs 300 processes digital signals. The plurality of RFUs 320 processes radio signals. At least one of the plurality of antennas 340 is installed in each of the plurality of RFUs 320. The path control apparatus 360 is connected between the plurality of DUs 300 and the plurality of RFUs 320. Here, the meaning that the path control apparatus 360 is connected between the plurality of DUs 300 and the plurality of RFUs 320 includes that the path control apparatus 360 is directly connected to the plurality of DUs 300 and the plurality of RFUs 320 or that the path control apparatus 360 is connected to the plurality of DUs 300 and the plurality of RFUs 320 via another path control apparatus 360 or another communication apparatus. The path control apparatus 360 may be connected to the plurality of DUs 300 and the plurality of RFUs 320 through the communication line. The communication line is a passage through which signals are transmitted, and it may include, for example, a twisted pair cable, a coaxial cable, an optical cable, microwaves, and radio waves. The path control apparatus 360 and the plurality of RFUs 320 preferably coupled through an optical cable. Each of the plurality of DUs 300, the plurality of RFUs 320, and the plurality of antennas 340 has a unique identifier. The path control apparatus 360 controls a signal path between the plurality of DUs 300 and the plurality of RFUs 320 based on the identifiers.

For example, a first DU, from among the plurality of DUs 300, may send a first signal, including a first identifier indicative of at least one destination RFU, to the path control apparatus 360. The first identifier may further indicate the first DU. The path control apparatus 360 may select a first path based on the first identifier. For example, the path control apparatus 360 may select the first path based on the first identifier and a look-up table that indicates an address or path corresponding to the first identifier. The path control apparatus 360 may send the first signal to the destination RFU through the first path. The destination RFU sends the received first signal to the terminal 380. If the number of destination RFUs is two or more, the destination RFUs may be synchronized with the first DU based on a timestamp. For example, the first DU and the destination RFU may exchange respective timestamps via the path control apparatus 360, calculate a time difference, and synchronize with each other based on the time difference. The destination RFU may send the first signal to the terminal 380 at a predetermined time based on the synchronized time. In this case, at least one of the first DU and the destination RFU may include a buffer and buffer the first signal, and the destination RFU may send the first signal to the terminal 380 at the predetermined time through the buffering. For example, when sending the first signal to the destination RFU via the path control apparatus 360, the first DU sends the first signal to the destination RFU in advance by taking a signal transfer delay time between the first DU and the destination RFU into consideration. Furthermore, the destination RFU receives the first signal, buffers the received first signal, converts the first signal into an RF signal when the first signal must be transmitted through the antennas included in the destination RFU, and sends the converted signal to the antennas included in the destination RFU.

Furthermore, the first identifier may further indicate at least one destination antenna. In this case, the destination RFU sends the first signal to the terminal 380 through the destination antenna. The destination antenna refers to a specific antenna that has been designated so that it sends the first signal to the terminal 380, from among the antennas included in the destination RFU. If the number of destination RFUs is one, the destination antenna may be one or more of the antennas included in the destination RFU. In some embodiments, if the number of destination RFUs is two or more, the destination antenna may be one or more of the antennas included in the two or more destination RFUs, respectively. If the number of destination RFUs is two or more and the first identifier further indicates a destination antenna, the destination RFU may be synchronized with the first DU, and it may send the first signal to the terminal through the destination antenna at a predetermined time. In this case, at least one of the first DU, the path control apparatus 360, and the destination RFU may buffer the first signal, and the destination RFU may send the first signal to the terminal through the destination antenna at the predetermined time through the buffering. For example, the destination RFU may receive and buffer the first signal, convert the first signal into the RF signal when the first signal must be transmitted through the destination antenna of the antennas included in the destination RFU, and send the converted signal to the destination antenna included in the destination RFU.

Meanwhile, the first RFU of the plurality of RFUs may send a second signal, including a second identifier indicative of at least one destination DU, to the path control apparatus 360. The second identifier may further indicate the first RFU. The second signal may be a signal received by the first RFU from the terminal 380. In this case, the first RFU may receive the second signal through all the antennas included in the first RFU or may receive the second signal through only a specific antenna of the antennas included in the first RFU. Furthermore, the number of first RFUs may be one or more. The path control apparatus 360 may select a second path based on the second identifier. For example, the path control apparatus 360 may select the second path based on the second identifier and a look-up table that indicates an address or path corresponding to the second identifier. The path control apparatus 360 may send the second signal to the destination DU through the second path. If the number of first RFUs is two or more, when the first RFU sends the second signal to the destination DU via the path control apparatus 360, the first RFU and the destination DU may be synchronized with each other, and the first RFU may perform buffering and send the second signal to the destination DU via the path control apparatus 360 at a predetermined time. In some embodiments, the path control apparatus 360 or the destination DU may perform buffering.

As described above, the path control apparatus 360 in accordance with the present invention flexibly couples a specific DU of the plurality of DUs 300 and a specific RFU of the plurality of RFUs 320. In some embodiments, the path control apparatus 360 flexibly couples a specific DU of the plurality of DUs 300 and a specific RFU of the plurality of RFUs 320, and a specific antenna included in the specific RFU. That is, the wireless communication system 30 in accordance with an embodiment of the present invention may send a signal from a specific DU to the terminal via a specific RFU (and a specific antenna of antennas included in the specific RFU) or may receive a signal from the terminal via a specific RFU (and a specific antenna of antennas included in the specific RFU) and send the signal to a specific DU. Accordingly, the wireless communication system 30 may perform the next-generation wireless BS operation method, such as multiple Base Station Multiple Input Multiple Output (Multi-BS MIMO) for transmitting the same data or different data to the terminal 380 through Coordinated Multi-Points (CoMP) and a plurality of base stations by employing a flexible connection between the plurality of DUs 300, the plurality of RFUs 320, and the plurality of antennas 340.

Here, the CoMP has been proposed to reduce inter-cell interference in a multi-cell environment and improve the performance of a terminal placed at the boundary of a cell. If a CoMP system is used, terminals may receive common data supported by multi-cell BSs. In this case, the communication performance of a terminal placed at the boundary of a cell can be improved.

The MIMO method refers to a method of improving data communication efficiency using a plurality of antenna. If the multi-BS MIMO method is used, terminals may receive common data supported by multiple BSs. In this case, inter-cell interference can be reduced, and the throughput of data can be increased.

Hereinafter, a path control method focused on the path control apparatus 360 in the wireless communication system 30 is described as an example.

Figure 4:
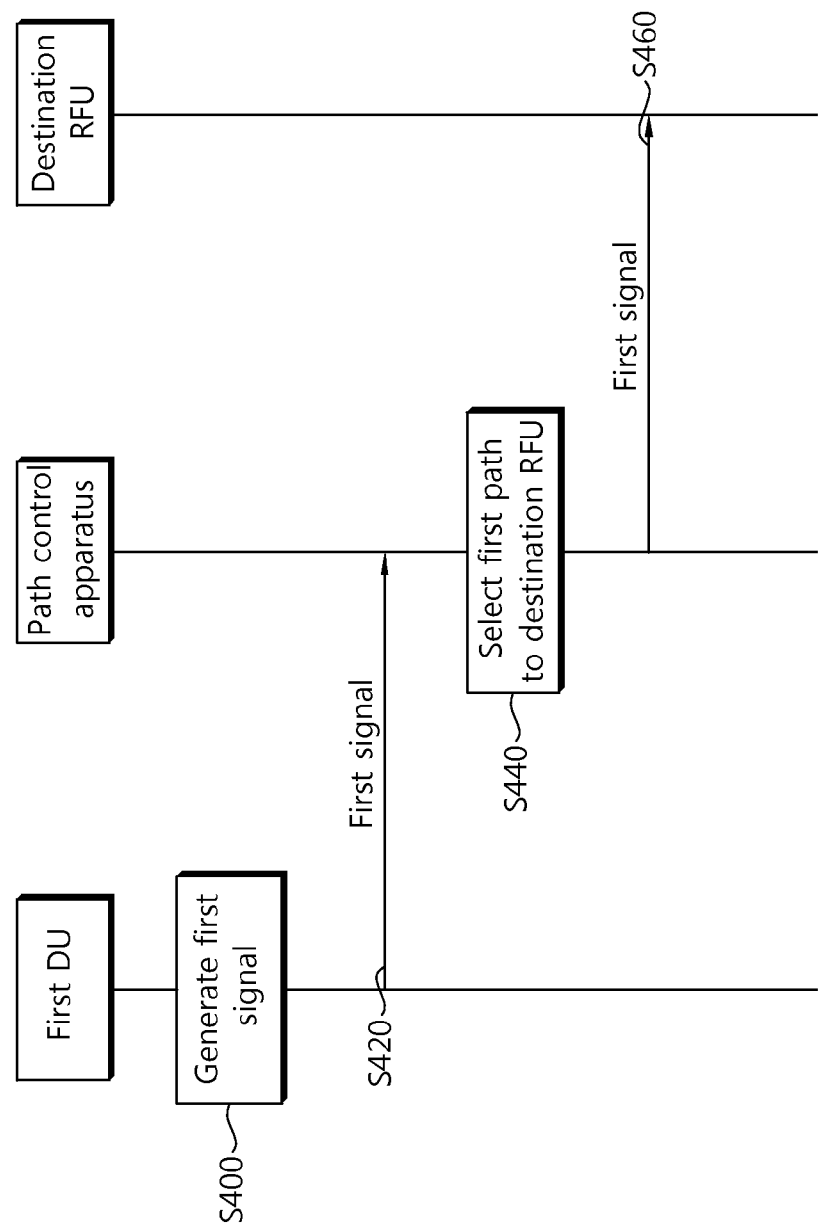
FIG. 4 is a flowchart illustrating a method of the path control apparatus controlling a transmission path in accordance with an embodiment of the present invention.

FIG. 4 is a flowchart illustrating a method of the path control apparatus controlling a transmission path in accordance with an embodiment of the present invention.

Referring to FIG. 4, the first DU of a plurality of DUs that forms a wireless communication system generates a first signal including a first identifier that indicates at least one destination RFU at step S400.

The first DU indicates a specific one of the plurality of DUs.

The destination RFU indicates a destination within the wireless communication system to which the first DU wants to send the first signal, from among a plurality of RFUs that forms the wireless communication system. The number of destination RFUs may be one or more.

The first identifier is an identifier indicating the destination RFU. The first identifier may further indicate the first DU.

The first identifier may further include at least one destination antenna. That is, when generating the first signal, the first DU may include an identifier, indicating the destination RFU and the destination antenna of antennas included in the destination RFU, in the first signal.

The first DU sends the generated first signal to the path control apparatus at step S420.

The path control apparatus receives the first signal including the first identifier.

The path control apparatus selects a first path to the destination RFU that is indicated by the first identifier at step S440.

Selecting the first path may be performed based on the first identifier and a look-up table indicating an address or path corresponding to the first identifier. The look-up table is a table in which the identifier of an RFU is set to correspond to a path to the RFU that is indicated by the identifier of the RFU. Accordingly, the path control apparatus may select the first path to the destination RFU, corresponding to the first identifier, from the look-up table. If the first identifier indicates the one or more destination RFUs, the first path may indicate respective paths to the one or more destination RFUs.

The path control apparatus sends the first signal through the selected first path at step S460.

In this case, the first signal is received by the destination RFU. The destination RFU may send the first signal to a terminal by performing a radio signal processing process on the first signal.

The process of sending a signal to a terminal through an RFU in a wireless communication system has been described above. A process of receiving a signal from a terminal from an RFU in a wireless communication system may be opposite to the above process. For example, the process of receiving a signal from a terminal from an RFU in a wireless communication system may be performed as follows.

Figure 5:
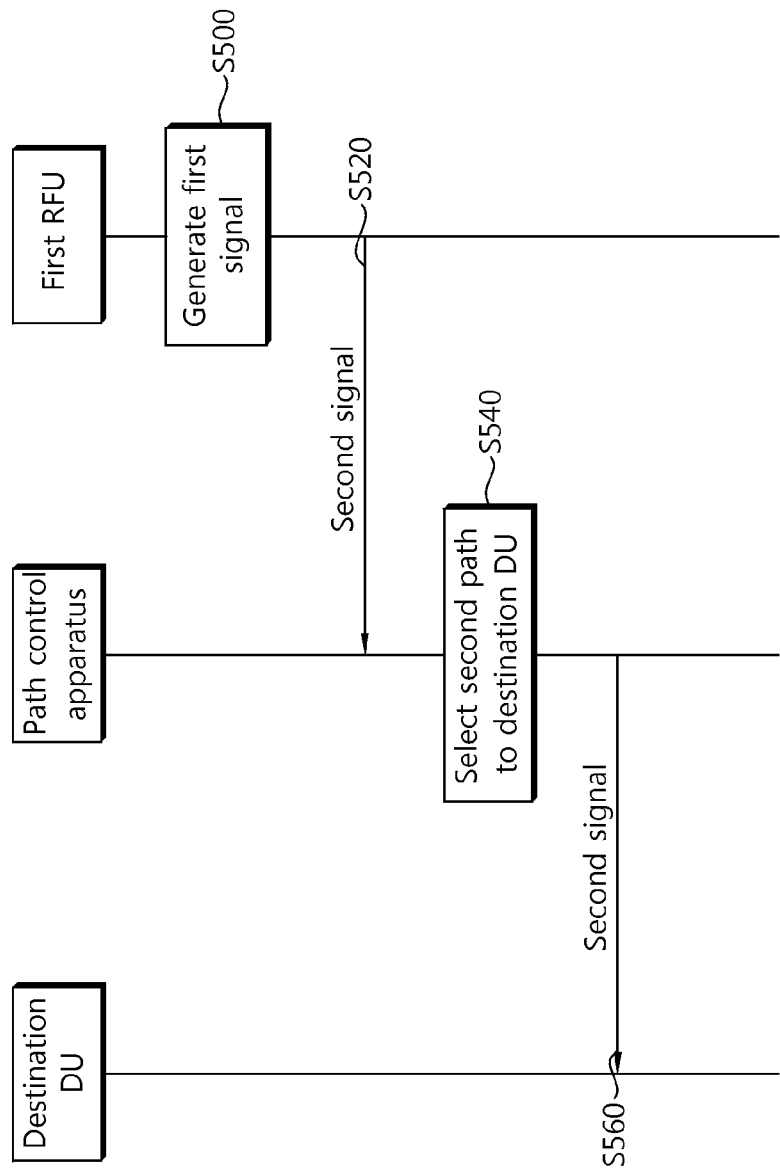
FIG. 5 is a flowchart illustrating the reception path control method of the path control apparatus in accordance with an embodiment of the present invention.

FIG. 5 is a flowchart illustrating the reception path control method of the path control apparatus in accordance with an embodiment of the present invention.

Referring to FIG. 5, a first RFU, from among a plurality of RFUs that forms a wireless communication system, generates a second signal including a second identifier that indicates at least one destination DU at step S500. Here, the meaning that the first RFU generates the second signal includes the first RFU receiving the second signal from a terminal and performing signal processing on the received second signal so that the second signal can be recognized by the path control apparatus.

The first RFU indicates a specific one of the plurality of RFUs.

The destination DU indicates a destination within the wireless communication system to which the first RFU wants to send the second signal, from among a plurality of DUs that forms the wireless communication system. The number of destination DUs may be one or more.

The second identifier is an identifier to indicate the destination DU. The second identifier may further indicate the first RFU.

The first RFU sends the generated second signal to the path control apparatus at step S520.

The path control apparatus receives the second signal including the second identifier.

The path control apparatus selects a second path to the destination DU based on the second identifier at step S540.

Selecting the second path may be performed based on the second identifier and a look-up table that indicates an address or path corresponding to the second identifier. The look-up table is a table in which the identifier of a DU is set to correspond to a path to the DU that is indicated by the identifier of the DU.

Accordingly, the path control apparatus may select the second path to the destination DU, corresponding to the second identifier, from the look-up table. If the second identifier indicates one or more destination DUs, the second path may indicate respective paths to the one or more destination DUs.

The path control apparatus sends the second signal through the selected second path at step S560.

In this case, the second signal is received by the destination DU.

As described above, in accordance with the path control method of the path control apparatus according to the present invention, a plurality of DUs and a plurality of RFUs which form a wireless communication system may perform flexible signal transmission and reception. The structure of a path control apparatus in accordance with an embodiment of the present invention is described below as an example.

Figure 6:
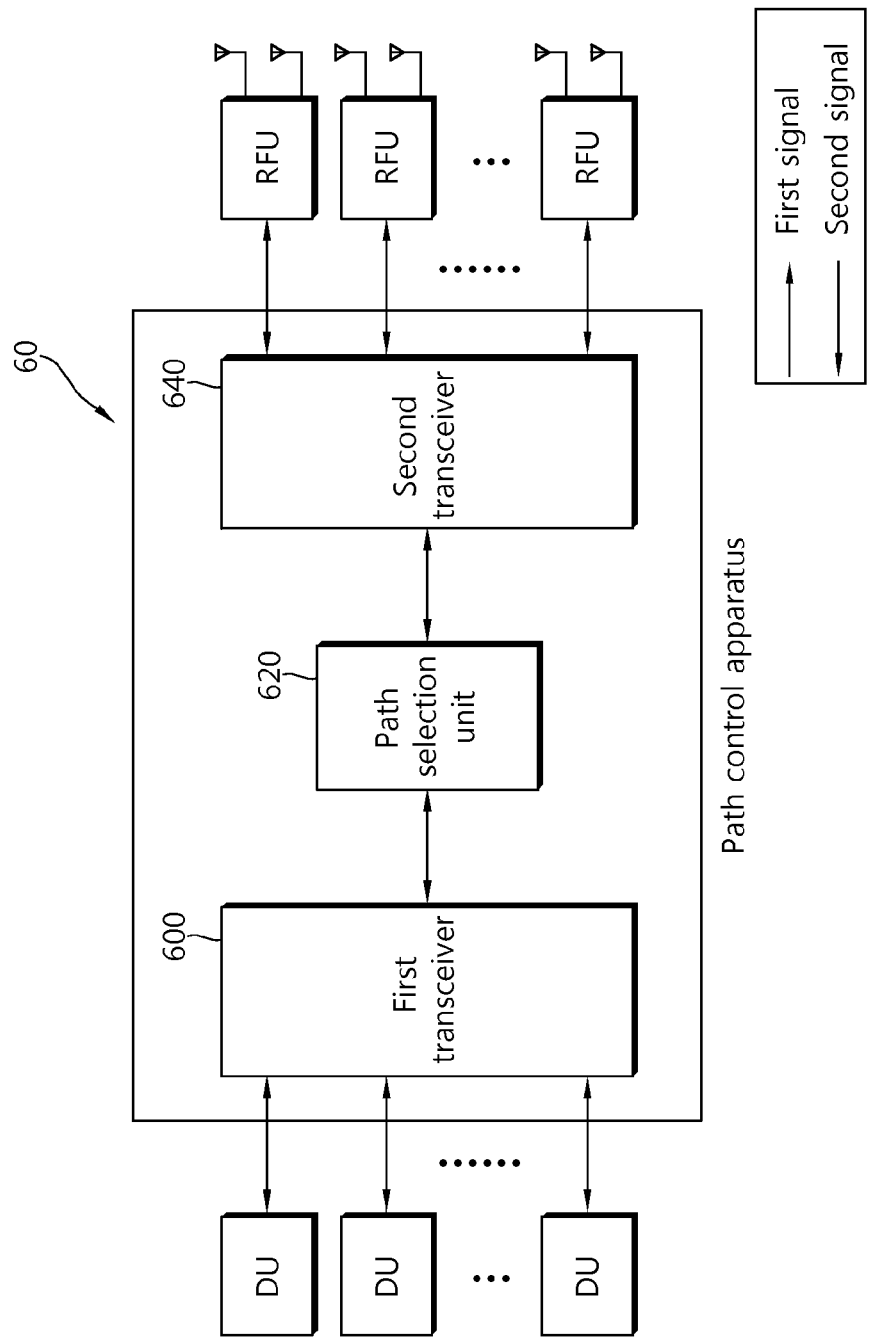
FIG. 6 shows the structure of a path control apparatus in accordance with an embodiment of the present invention.

FIG. 6 shows the structure of a path control apparatus in accordance with an embodiment of the present invention.

Referring to FIG. 6, the path control apparatus 60 includes a first transceiver unit 600, a path selection unit 620, and a second transceiver unit 640.

The first transceiver unit 600 is connected to a plurality of DUs. The first transceiver unit 600 may receive a first signal, including a first identifier indicative of a destination RFU, from a first DU, from among the plurality of DUs, or may receive a second signal, including a second identifier indicating a destination DU, from the path selection unit 620 and send the second signal to the destination DU. The first transceiver unit 600 may be divided into a first transmission unit and a first reception unit. In this case, the first transmission unit may send the second signal to the destination DU, and the first reception unit may receive the first signal from the first DU.

The second transceiver unit 640 is connected to a plurality of RFUs. The second transceiver unit 640 may receive a second signal, including a second identifier indicative of a destination DU, from a first RFU, from among the plurality of RFUs, or may send a first signal, including a first identifier indicative of a destination RFU, form the path selection unit 620 to the destination RFU. The second transceiver unit 640 may be divided into a second transmission unit and a second reception unit. In this case, the second transmission unit may send the first signal to the destination RFU, and the second reception unit may receive the second signal from the first RFU.

The path selection unit 620 may select a first path to the destination RFU based on the first identifier. Furthermore, the path selection unit 620 may select a second path to the destination DU based on the second identifier.

Regarding the operation of the path control apparatus 60, the case where the path control apparatus 60 receives the first signal from the first DU and sends the first signal to the destination RFU and the case where the path control apparatus 60 receives the second signal from the first RFU and sends the second signal to the destination DU are described below.

Figure 7:
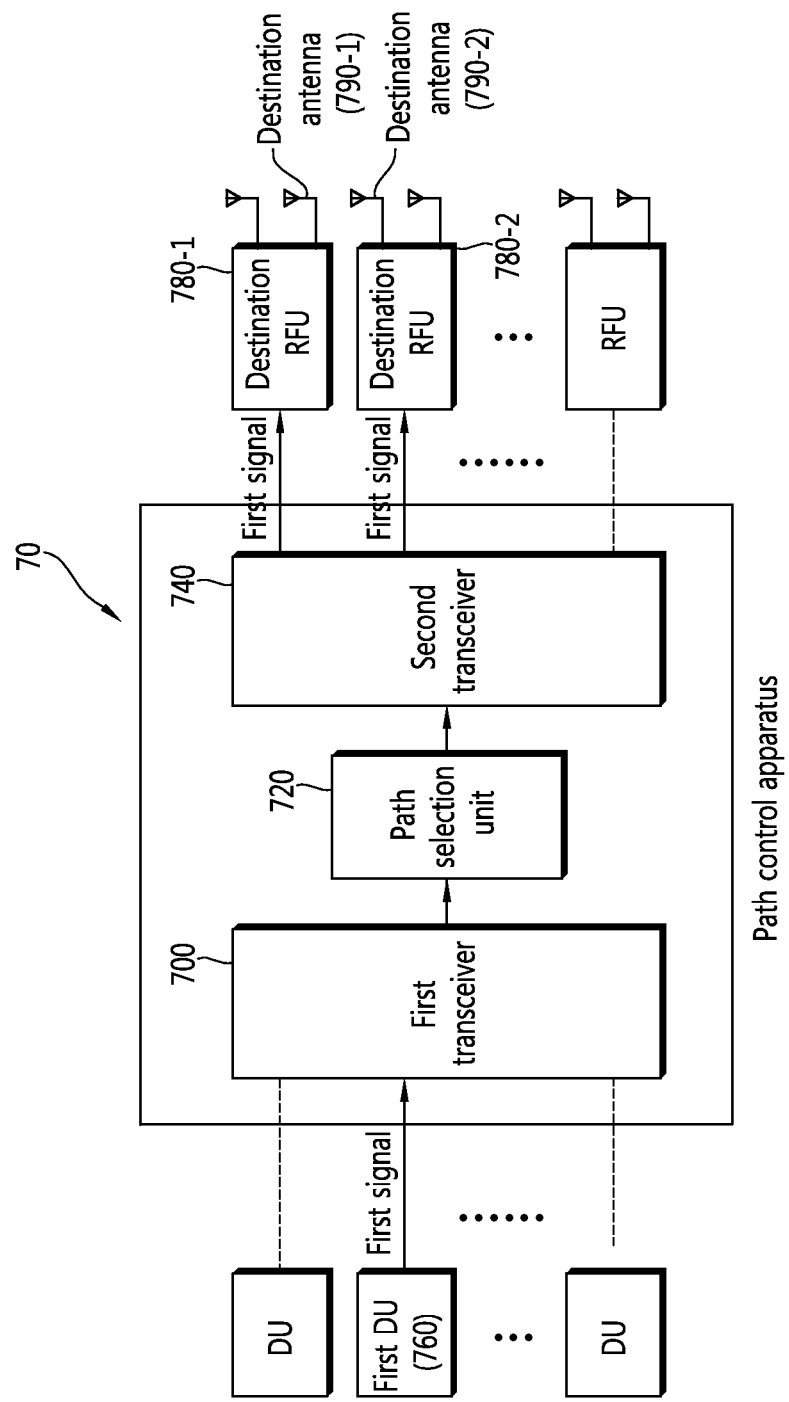
FIG. 7 shows the case where a path control apparatus receives a signal from a DU and sends the signal to an RFU in accordance with an embodiment of the present invention.

FIG. 7 shows the case where a path control apparatus receives a signal from a DU and sends the signal to an RFU in accordance with an embodiment of the present invention.

Referring to FIG. 7, the path control apparatus 7 includes a first transceiver unit 700, a path selection unit 720, and a second transceiver unit 740.

The first transceiver unit 700 is connected to a plurality of DUs. The first transceiver unit 700 receives a first signal, including a first identifier indicative of destination RFUs 780-1 and 780-2, from a first DU 760 of the plurality of DUs.

Here, the first DU 760 indicates a specific one of the plurality of DUs.

The destination RFUs 780-1 and 780-2 indicate destinations within the wireless communication system to which the first DU 760 want to send the first signal, from among a plurality of RFUs that forms the wireless communication system. The number of destination RFUs 780-1 and 780-2 may be one or more.

The first identifier is an identifier to indicate the destination RFUs 780-1 and 780-2. The first identifier may further indicate the first DU 760.

The first identifier may further indicate one or more destination antennas 790-1 and 790-2. That is, when generating the first signal, the first DU 760 may include an identifier, indicating the destination RFUs 780-1 and 780-2 and the destination antennas 790-1 and 790-2, from among antennas included in a destination RFU, in the first signal.

The path selection unit 720 selects a first path to the destination RFUs 780-1 and 780-2 based on the first identifier.

The path selection unit 720 may select the first path based on the first identifier and a look-up table that indicates an address or path corresponding to the first identifier. If the first identifier indicates the one or more destinations RFUs 780-1 and 780-2, the first path may indicate respective paths to the one or more destination RFUs 780-1 and 780-2.

The second transceiver unit 740 sends the first signal through the selected first path.

In this case, the first signal may be received by the destination RFUs 780-1 and 780-2, and the destination RFUs 780-1 and 780-2 may send the first signal to a terminal by performing a radio signal processing process. If the number of destination RFUs 780-1 and 780-2 is plural, a wireless communication system including the plurality of destination RFUs 780-2 and 780-2 may send the first signal through the plurality of destination RFUs 780-1 and 780-2. Furthermore, if the number of destination RFUs 780-1 and 780-2 and the first identifier further indicates the destination antennas 790-1 and 790-2 included in the destination RFUs 780-1 and 780-2, the wireless communication system may send the first signal through only the destination antennas 790-1 and 790-2, from among the antennas included in the respective destination RFUs 780-1 and 780-2. Accordingly, the wireless communication system can perform CoMP and multi-BS MIMO communication.

The process in which the path control apparatus 70 receives a signal from the first DU 760 and sends the signal to the destination RFUs 780-1 and 780-2 has been described above. If a signal is received from a specific RFU and then transmitted to a destination DU, a process opposite to the above process may be performed and is described below as an example.

Figure 8:
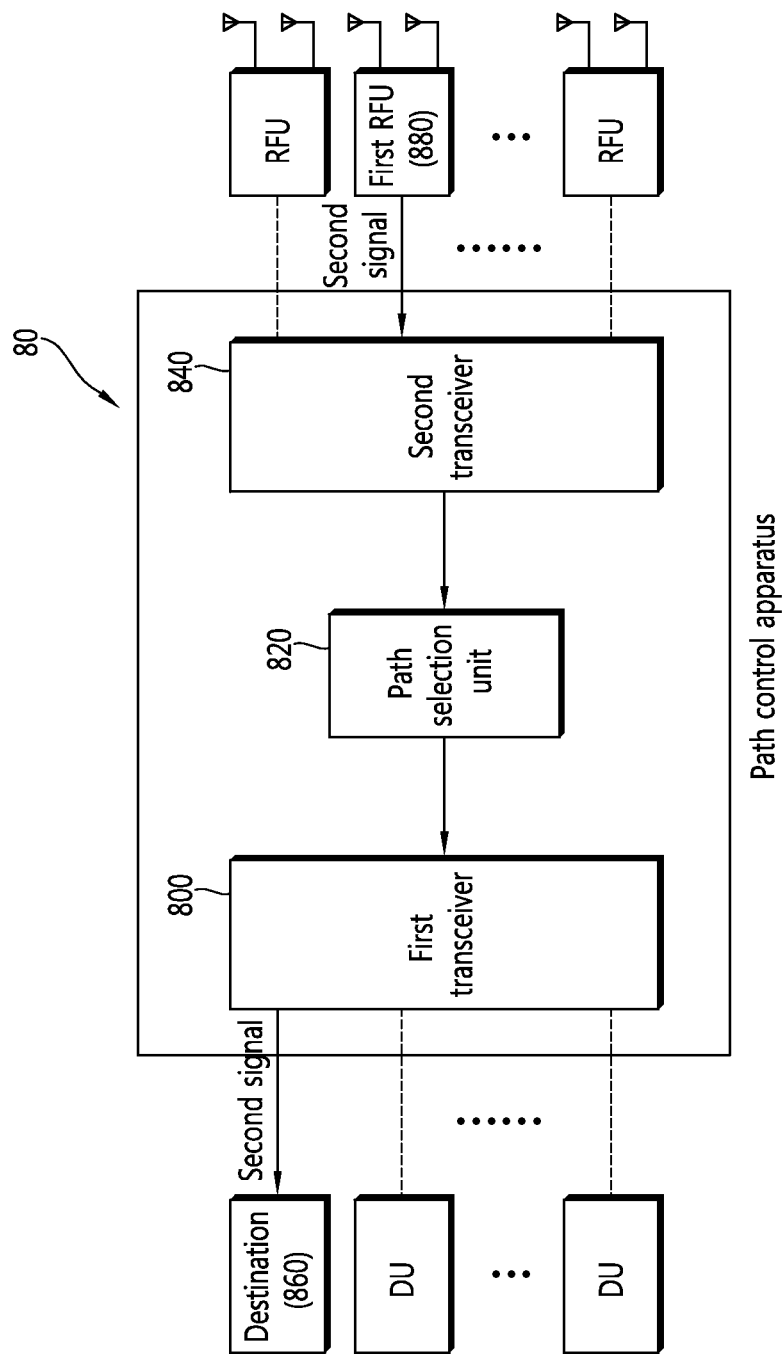
FIG. 8 shows the case where a path control apparatus receives a signal from an RFU and sends the signal to a DU.

FIG. 8 shows the case where a path control apparatus receives a signal from an RFU and sends the signal to a DU.

Referring to FIG. 8, the path control apparatus 80 includes a first transceiver unit 800, a path selection unit 820, and a second transceiver unit 840.

The second transceiver unit 840 is connected to a plurality of RFUs. The second transceiver unit 840 receives a second signal, including a second identifier indicative of a destination DU 860, from a first RFU 880, from a plurality of RFUs.

The first RFU 880 indicates a specific one of the plurality of RFUs.

The destination DU 860 indicates a destination within the wireless communication system to which the first RFU wants to send the first signal, from among a plurality of DUs that forms the wireless communication system. The number of destination DUs 860 may be one or more.

The second identifier is an identifier to indicate the destination DU 860. The second identifier may further indicate a first RFU 880.

The path selection unit 820 selects a second path to the destination DU 880 based on the second identifier.

The path selection unit 820 may select the second path based on the second identifier and a look-up table that indicates an address or path corresponding to the second identifier. If the second identifier indicates the one or more destination DUs 860, the second path may indicate respective paths to the one or more destination DUs.

The first transceiver unit 800 sends the second signal through the selected second path.

In this case, the second signal is received by the destination DU 860.

As described above, a wireless communication system including the path control apparatus according to the present invention can perform free connection and signal transmission and reception between a plurality of DUs and a plurality of RFUs (and between a plurality of antennas included in the plurality of RFUs) and can perform the next-generation wireless BS operation method, such as CoMP and multi-BS MIMO, based on the free connection and signal transmission and reception.

In accordance with the present invention, signals can be flexibly transmitted and received between a plurality of DUs and a plurality of RFUs in a wireless communication system.

In accordance with the present invention, signals can be flexibly transmitted and received between a plurality of DUs, a plurality of RFUs, and a plurality of antennas included in the plurality of RFUs in a wireless communication system.

In accordance with the present invention, a plurality of BSs can perform communication using a plurality of antennas in a wireless communication system.

While the invention has been shown and described with respect to the preferred embodiments, it will be understood by those skilled in the art that various changes and modifications may be made without departing from the spirit and scope of the invention as defined in the following claims.

What is claimed is:

1. A path control method of a path control apparatus in a wireless communication system comprising a plurality of Digital Units (DUs), a plurality of Radio Frequency Units (RFUs), and a plurality of antennas, the path control method comprising:
    receiving a first signal, comprising a first identifier indicative of at least one destination RFU, from a first DU;
    selecting a first path to the at least one destination RFU indicated by the first identifier; and
    sending the first signal through the selected first path.

2. The path control method as claimed in claim 1, wherein the first identifier further indicates at least one destination antenna.

3. The path control method as claimed in claim 2, wherein selecting the first path is performed based on a look-up table in which the first identifier is set to correspond to a path.

4. The path control method as claimed in claim 1, further comprising:
    receiving a second signal, comprising a second identifier indicative of at least one destination DU, from a first RFU;
    selecting a second path to the at least one destination DU indicated by the second identifier; and
    sending the second signal through the selected second path.

5. The path control method as claimed in claim 4, wherein selecting the second path is performed based on a look-up table in which the second identifier is set to correspond to a path.

6. A path control apparatus configured to couple a plurality of Digital Units (DUs) and a plurality of Radio Frequency Units (RFUs) in a communication system comprising the plurality of DUs, the plurality of RFUs, and a plurality of antennas, the path control apparatus, comprising:
    a first transceiver unit configured to receive a first signal, comprising a first identifier indicative of a destination RFU, from a first DU;
    a path selection unit configured to select a first path to the destination RFU based on the first identifier; and
    a second transceiver unit configured to send the first signal through the selected first path.

7. The path control apparatus as claimed in claim 6, wherein the first identifier further indicates at least one destination antenna.

8. The path control apparatus as claimed in claim 6, wherein the path selection unit selects the first path based on a look-up table in which the first identifier is set to correspond to a path.

9. The path control apparatus as claimed in claim 6, wherein:
    the second transceiver receives a second signal, comprising a second identifier indicative of at least one destination DU, from a first RFU;
    the path selection unit selects a second path to the at least one destination DU indicated by the second identifier; and
    the first transceiver sends the second signal through the selected second path.

10. The path control apparatus as claimed in claim 9, wherein the path selection unit selects the second path based on a look-up table in which the second identifier is set to correspond to a path.

11. A wireless communication system, comprising:
    a plurality of Digital Units (DUs) configured to process digital signals;
    a plurality of Radio Frequency Units (RFUs) configured to process radio signals;
    a plurality of antennas at least one of which is included in each of the plurality of RFUs; and
    a path control apparatus connected between the plurality of DUs and the plurality of RFUs and configured to control a path of signals between the plurality of DUs and the plurality of RFUs,
    wherein each of the plurality of DUs, the plurality of RFUs, and the plurality of antennas has a unique identifier, and
    the path control apparatus controls the path based on the identifiers.

12. The wireless communication system as claimed in claim 11, wherein:
    a first DU sends a first signal, comprising a first identifier indicative of at least one destination RFU, to the path control apparatus, and
    the path control apparatus selects a first path based on the first identifier and sends the first signal to the at least one destination RFU through the first path.

13. The wireless communication system as claimed in claim 12, wherein the first identifier further indicates at least one destination antenna.

14. The wireless communication system as claimed in claim 12, wherein the path control apparatus selects the first path based on a look-up table in which the first identifier is set to correspond to a path.

15. The wireless communication system as claimed in claim 11, wherein:
    a first RFU sends a second signal, comprising a second identifier indicative of at least one destination DU, to the path control apparatus, and
    the path control apparatus selects a second path based on the second identifier and sends the second signal to the at least one destination DU through the second path.

16. The wireless communication system as claimed in claim 15, wherein the path control apparatus selects the second path based on a look-up table in which the second identifier is set to correspond to a path.

17. The wireless communication system as claimed in claim 12, wherein:
    the at least one destination RFU is synchronized with the first DU based on a timestamp:
    the at least one destination RFU sends the first signal to a terminal at a predetermined time.

18. The wireless communication system as claimed in claim 17, wherein:
    at least one of the first DU and the at least one destination RFU buffers the first signal, and the at least one destination RFU sends the first signal to the terminal through the buffering at the predetermined time.

19. The wireless communication system as claimed in claim 13, wherein:
the at least one destination RFU is synchronized with the first DU based on a timestamp, and
the at least one destination RFU sends the first signal to a terminal through the at least one destination antenna at a predetermined time.

20. The wireless communication system as claimed in claim 19, wherein:
at least one of the first DU and the at least one destination RFU buffers the first signal, and
the at least one destination RFU sends the first signal to the terminal through the at least one destination antenna at the predetermined time.

* * * * *